United States Patent [19]

Hayashi et al.

[11] Patent Number: 5,743,173
[45] Date of Patent: Apr. 28, 1998

[54] BAKE STUFF COOKER

[75] Inventors: Takahiro Hayashi; Taijiro Kasahara, both of Otsu; Terumi Furuya, Uji; Minoru Yoshida, Otsu, all of Japan

[73] Assignee: Sanyo Electric Co., Ltd., Moriguchi, Japan

[21] Appl. No.: 791,534

[22] Filed: Jan. 30, 1997

[30] Foreign Application Priority Data

Jan. 31, 1996 [JP] Japan ................................. 8-015615
Jan. 31, 1996 [JP] Japan ................................. 8-015617

[51] Int. Cl.$^6$ .............................. A47J 27/00; A47J 31/00; H05B 1/02; H05B 6/68
[52] U.S. Cl. .............................. 99/331; 99/325; 99/327; 99/349; 99/378; 99/DIG. 14; 219/492; 219/497; 219/518; 219/711; 219/719
[58] Field of Search .............................. 99/349, 372–378, 99/379–383, DIG. 14, 325–334; 219/492, 497, 506, 518, 627, 685, 703–719, 754; 340/596; 374/130, 155; 364/400, 506, 557, 709.03, 925.6; 426/523

[56] References Cited

U.S. PATENT DOCUMENTS

| | | | |
|---|---|---|---|
| 4,350,858 | 9/1982 | Yoshida | 99/328 X |
| 4,356,370 | 10/1982 | Horinouchi | 219/492 X |
| 4,383,157 | 5/1983 | Nakata et al. | 219/711 |
| 4,484,050 | 11/1984 | Horinouchi et al. | 99/325 X |
| 4,499,357 | 2/1985 | Kojima | 219/711 |
| 4,517,429 | 5/1985 | Horinouchi | 219/719 X |
| 4,553,011 | 11/1985 | Nakata et al. | 219/711 X |
| 4,617,441 | 10/1986 | Koide et al. | 99/DIG. 14 |
| 4,705,926 | 11/1987 | Sakai et al. | 219/492 X |
| 4,864,088 | 9/1989 | Hiejima et al. | 219/492 X |
| 4,939,333 | 7/1990 | Sakai et al. | 219/518 X |
| 5,455,404 | 10/1995 | Sakai et al. | 99/331 X |
| 5,457,302 | 10/1995 | Amano et al. | 99/327 X |

*Primary Examiner*—Timothy F. Simone
*Attorney, Agent, or Firm*—Cohen, Pontani, Lieberman & Pavane

[57] ABSTRACT

A bake stuff cooker 10 includes: a main body case 1; a mount plate 2 attached on an upper surface of the main body case 1 for mounting a cook stuff; a heating plate 3 pivotally switchable between a facing position facing the mount plate 2 to form a gap corresponding to the thickness of the cook stuff above the mount plate 2 and a separating position separating from the facing position; the heating plate 3 forming a heating face on an upper surface and/or a lower surface thereof; a lid 5 for forming another gap corresponding to the thickness of another cook stuff above the heating plate 3 and for covering the heating face 31a on the upper surface of the heating plate 3; an induction heating coil 11 for heating the heating face; a control unit 9 for controlling to drive and stop the induction heating coil 11; and a thermistor 92 for detecting a temperature of the heating face, wherein the control unit 9 is provided with a drive time setting circuit 93 for setting a drive time of the induction heating coil 11 in accordance with the temperature of the heating plate 3 detected by the thermistor 92 in starting to drive the induction heating coil 11.

12 Claims, 18 Drawing Sheets

BAKE STUFF COOKER

BACKGROUND OF THE INVENTION

1. Field of the Invention

The present invention relates to a bake stuff cooker, particularly to a heating control of a bake stuff cooker for heating previously formed and baked bread or the like and browning the bread especially for using the bread for hamburger.

2. Description of the Related Art

A conventional bake stuff cooker is mainly constituted by a main body case having an operating unit and the like, a lower grill plate (mount plate) attached on the upper face of the main body case for mounting and heating cook stuff such as bread or the like for hamburger and an upper heating plate (heating plate) arranged pivotably above the lower grill plate to form a gap corresponding to a thickness of the cook stuff for serving as a lid covering the lower grill plate. The upper heating plate is installed pivotably such that the position thereof is switched between a facing position facing the lower grill plate and a separating position separating from the facing position.

In using the bake stuff cooker, the upper heating plate is opened, formed bread is mounted on the lower grill plate and the upper heating plate is closed. A predetermined power is supplied and bread on the lower grill plate is heated by heat from a heating face. After elapsing a predetermined cooking time, baked bread is taken out from the lower grill plate by opening the upper heating plate. Supply of power to the heating device is stopped, the temperature of the mount plate is maintained in a temperature maintaining state and the cooker stays in a stand-by state until heating of bread is started again by receiving an order from a customer.

According to the above-described bake stuff cooker, when the stand-by time from when the heating device is operated again after receiving an order from a customer to when the cooking is started, is long, the lowering of the temperature of the heating face becomes considerable and the bread taken out after elapsing the cooking time is liable to be heated insufficiently. Similarly, if the stand-by time is extremely short, the heating is liable to be excessive.

Also, according to the above-described bake stuff cooker, when the bake stuff cooker is in a stand-by state in which the upper heating plate is heated, a predetermined amount of electric power is always supplied to the heating device even if there is no customer, thereby consuming the electric power. On the other hand, if the upper heating plate is heated after receiving an order from a customer, an additional period of time will be required until the upper heating plate is heated up to a predetermined temperature, thereby increasing the period of time for waiting.

SUMMARY OF THE INVENTION

The purpose of the present invention is to solve the aforementioned problem by providing a bake stuff cooker capable of heating uniformly cook stuff at every time irrespective of an amount of duration of the stand-by time from stopping cooking to starting cooking. Also, the purpose of the present invention is to provide a bake stuff cooker by which the cooking time is shortened and the conservation of power is achieved.

According to the present invention, there is provided a bake stuff cooker comprising: a main body case; a mount plate attached on an upper surface of the main body case for mounting a cook stuff; a heating plate pivotally switchable between a facing position facing the mount plate to form a gap corresponding to the thickness of the cook stuff above the mount plate and a separating position separating from the facing position; the heating plate forming a heating face on an upper surface and/or a lower surface thereof; a lid for forming another gap corresponding to the thickness of another cook stuff above the heating plate and for covering the heating face on the upper surface of the heating plate; a heating device for heating the heating face; a control unit for controlling to drive and stop the heating device; and a temperature detecting means for detecting a temperature of the heating face, wherein the control unit is provided with a drive time setting circuit for setting a drive time of the heating device in accordance with the temperature of the heating face detected by the temperature detecting means in starting to drive the heating device.

DETAILED DESCRIPTION OF THE PREFERRED EMBODIMENTS

Figure 1:
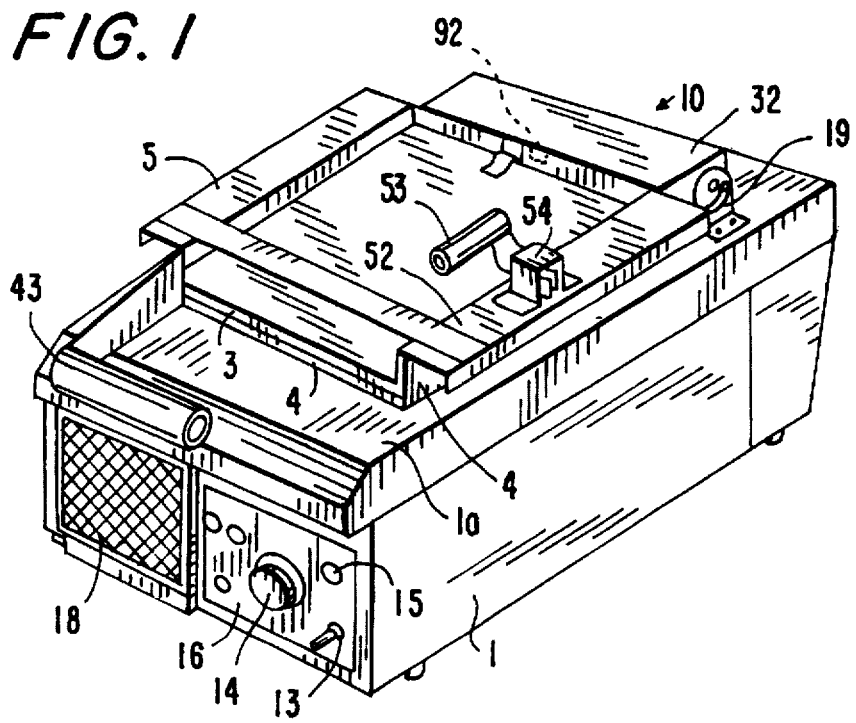
FIG. 1 is a perspective view for explaining the outlook of a bake stuff cooker according to an embodiment of the present invention.

It is preferable that the bake stuff cooker according to the present invention uses, as a heating device i.e. a heat source, a heater of an electromagnetic induction type or a heater of an electric heater type using a halogen light or the like.

Food stuff such as bread for hamburger, snack or the like is pointed out as the cook stuff in the present invention. The bake stuff cooker according to the present invention is preferable in browning these food stuffs.

According to the present invention, the temperature detecting means is a means for detecting directly or indirectly the temperature of the heating face formed on the upper surface and/or on the lower surface of the heating plate. The temperature detecting means is preferably arranged in the proximity of the mount plate, the heating plate, or the lid. As the temperature detecting means, non-contact type thermometers of, for example, a thermoelectric type thermometer such as a thermocouple or the like, a resistance thermometer such as a thermistor or the like, a radiation temperature sensor and the like are pointed out. It is preferable that these temperature detecting means can be arbitrarily driven by a switch or the like.

The drive time setting circuit preferably sets an adjusted drive time of the heating device by adding or subtracting a drive time in respect of a predetermined reference drive time of the heating device.

The drive time setting circuit is preferably a circuit for setting the drive time of the heating device in accordance with the temperature of the heating face that is detected during a time period after stopping to drive the heater and immediately before starting to drive the heater, or a time point immediately after starting to drive the heater, or the time points of the both cases.

It is preferable that the bake stuff cooker includes heat shielding plates disposed between the heating plate and the mount plate for restraining heat from flowing out from surrounding gaps between the heating plate and the mount plate.

Now, in using the bake stuff cooker of the present invention, the lid is opened, the cook stuff is mounted on the mount plate and the lid is closed. A predetermined power is supplied to the heating device and the cook stuff is heated by heat from the heating face. After a predetermined cook time has elapsed, the lid is opened, the cook stuff on the mount plate is taken out, the lid is closed, and the heating face is maintained in a temperature maintaining state. The supply of power to the heating device is stopped and the cooker stays in a stand-by state until starting to heat the cook stuff again and the temperature of the heating face is dropped.

When the lid is opened, the cook stuff is mounted on the mount plate and the heating device is started to drive again, the temperature of the heating face is detected by the temperature detecting means. The control unit sets the drive time of the heating device in accordance with the detected temperature by driving the drive time setting circuit. That is, when the detected temperature is low, the drive time is set comparatively long and when the detected temperature is high, the drive time is set comparatively short. In this way, the temperature drop of the heating face caused in the stand-by time period from when the heating device is stopped to drive to when the heating device is started to drive again, is compensated by adjusting the heating time and therefore, the cook stuff can be heated uniformly at every time.

The present invention further provides a bake stuff cooker wherein the control unit has a cooking mode for heating and cooking the cook stuff by driving the heating device by supplying a first power and a temperature maintaining mode for maintaining the temperature of the heating face by driving the heating device by supplying a second power lower than the first power after executing the cooking mode, and the control unit is provided with a supply power switching circuit for switching the power supplied to the heating device from the first power to the second power when the first power is supplied to drive the heating device and the closed state of the heating plate is released.

The cooking mode is a drive mode of the heating device for maintaining the temperature of the heating face for a period of time predetermined by a cooking heating temperature suitable for the cook stuff and, when the cook stuff is, for example, a formed bread, it is preferably the drive mode of the heating device that is driven until the bread is browned.

This allows the temperature of the heating face to be maintained by the low power supplied to the heating device during the period from when the heated cook stuff is taken out to when a new cook stuff is mounted. Accordingly, the period of time required for elevating the temperature to the predetermined cooking temperature is shortened and the power consumption is far lower than that in the case where the temperature is always maintained by the high power for cooking.

Further, if the control unit is provided with the power supply switching circuit for switching the power supplied to the heating device from the first power to the second power after the first power is supplied for a predetermined period of time, the temperature of the heating face is maintained at a high temperature while the first power is being supplied to the heating device. Accordingly, the period of time required for elevating the temperature to the predetermined cooking temperature is extremely shortened.

Also, if the control unit is provided with the power supply switching circuit for switching the power supplied to the heating device from the first power to the second power in accordance with the degree of opening of the lid, the temperature of the heating face is maintained by receiving the power supply in accordance with the degree of opening of the lid. Accordingly, the period of time required for elevating the temperature to the predetermined cooking temperature is extremely shortened and the power consumption is far smaller than that in the case where the temperature is maintained by the large power for cooking.

It is preferable that the heating plate is provided with a lock mechanism disposed between the heating plate and the main body case for releasably locking the heating plate in the closed state, the control unit comprises a lock detecting means for detecting a lock position and a lock-release position of the heating plate, and the control unit switches the power supplied to the heating device with the power supply switching circuit in accordance with a detection result of the lock detecting means.

As the lock mechanism, the one utilizing a magnetic force or the one by engagement of a ball catcher or the like is pointed out. As the lock detecting means, a displacement sensor such as a limit switch, a microswitch or the like, or an optical sensor is pointed out.

It is preferable that the heating device comprises an induction heating coil disposed in the main body case and below the mount plate, the mount plate comprises a nonmagnetic material that is not induced to generate current by the electromagnetic induction operation of the induction heating coil, and the heating plate comprises a magnetic material heated by the electromagnetic induction operation of the induction heating coil. By this construction, a heating face is formed on the upper and lower two surfaces of the heating plate and further, the lid supplies radiation heat to the mount plate and covers the mount plate and the heating plate and therefore, the temperature can be maintained efficiently with low power.

Considering that the bake stuff cooker of the invention is suitable for use at shops serving or selling baked stuff, the drive time setting circuit preferably operates again when the heating device is restarted after a pause, since the bake stuff cooker is expected to be used intermittently.

Also, given that an operator may leave the bake stuff cooker or be occupied with other work, the control unit is preferably provided with informing means for informing that the temperature of the heating faces is detected to reach a predetermined temperature by the temperature detecting means.

[Embodiments of the main body]

Figure 2:
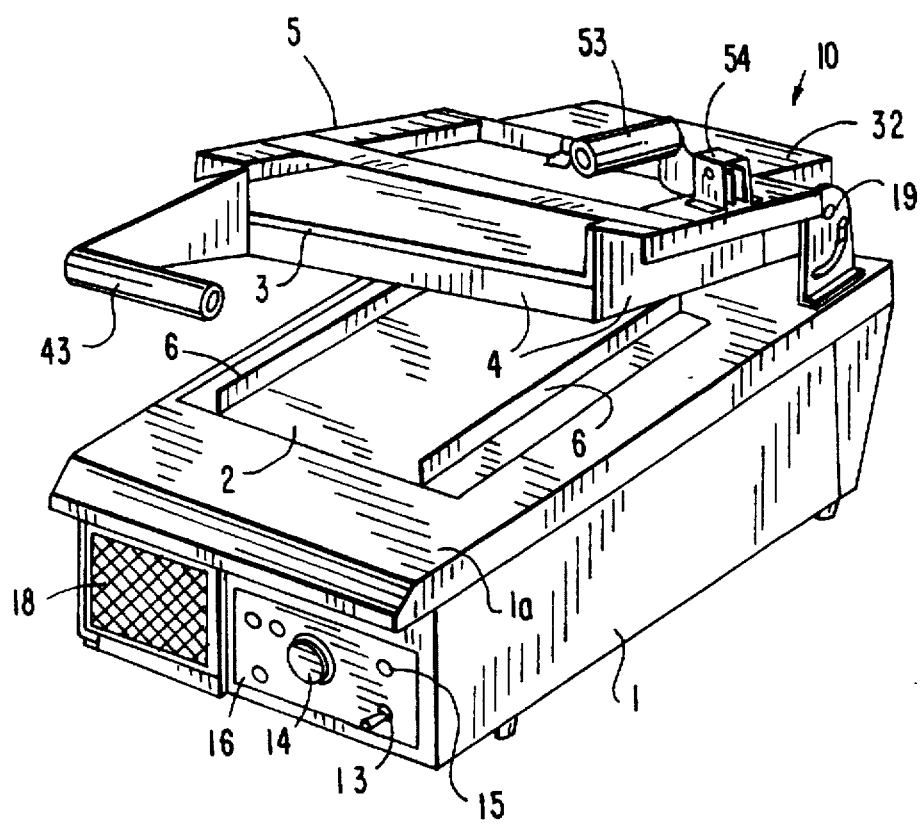
FIG. 2 is a perspective view showing a state where a heating plate of the bake stuff cooker of FIG. 1 is partially opened.
Figure 3:
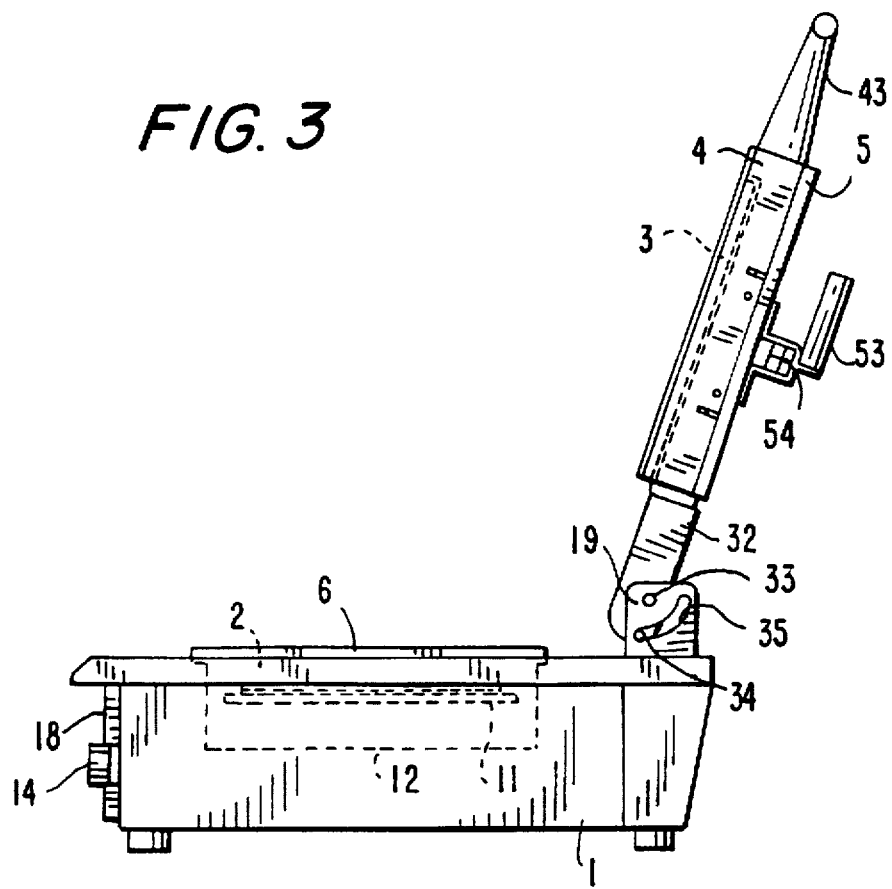
FIG. 3 is a side view showing a state where the heating plate of the bake stuff cooker of FIG. 1 is fully opened.
Figure 4:
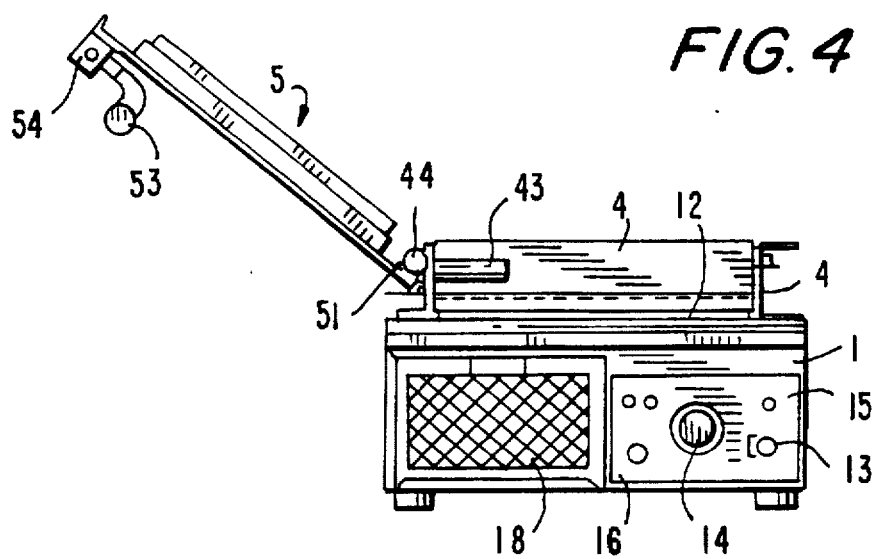
FIG. 4 is a front view showing a state where only a lid of the bake stuff cooker of FIG. 1 is fully opened.

FIG. 1 through FIG. 4 show an outlook of an electromagnetic type bake stuff cooker according to an embodiment of the present invention. A cooker 10 is mainly constituted by a main body case 1, a mount plate 2 (FIG. 2) attached onto an upper face 1a (FIG. 3) of the main body case 1 and capable of mounting cook stuff, a heating plate 3 installed pivotably above the mount plate 2, heat shielding plates 4 attached at peripheral portions of the heating plate 3 and a lid 5 covering the upper portion of the heating plate 3. FIG. 1 and FIG. 2 are perspective views respectively showing states where the heating plate 3 is closed and where it is opened, FIG. 3 is a side view showing a state where the heating plate 3 is opened and FIG. 4 is a front view showing a state where the heating plate 3 is closed and the lid 5 is opened. According to the cooker 10, the heating plate 3 forms the heating face and an induction heating coil 11 (FIG. 3), mentioned later, is the heating device.

The main body case 1 comprises a case made of steel plate for storing the induction heating coil 11 at the inside thereof (FIG. 3) and the induction heating coil 11 is sealed in a seal case 12 for restraining leakage of magnetic flux, of which upper portion is opened. The front face of the main body case 1 is arranged with a control panel 16 in which a heating switch 13, an output adjusting unit 14, a display lamp 15 and a buzzer drive unit 17 and the like are arranged and a duct 18 for cooling the inside of the case 1. The mount plate 2 is arranged at the opening of the seal case 12 and the induction heating coil 11 is arranged substantially just below the mount plate 2. A thermistor 92 for detecting the temperature of the heating plate 3 is arranged at the rear portion of the upper face 1a of the main body case 1 (FIG. 1). The thermistor 92 is separated from the lower face of the heating plate 3 when the heating plate 3 is opened and is brought into contact with the lower face of the heating plate 3 when the heating plate 3 is closed by which the temperature can be detected. The thermistor 92 is used in accordance with a control program mentioned later (shown in Embodiments 1 to 5).

Figure 5:
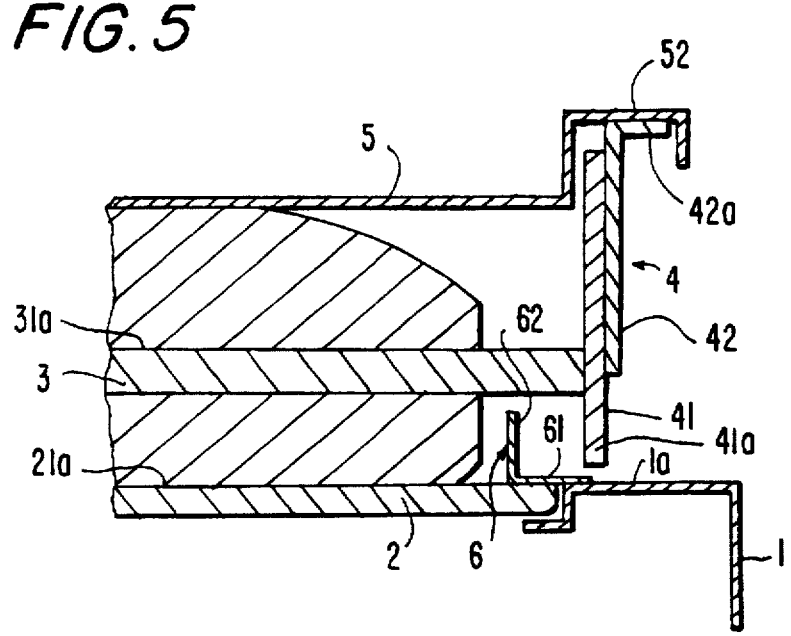
FIG. 5 is a sectional view of essential portions showing the closed heating plate, a heat shielding plate and a regulating frame of the bake stuff cooker of FIG. 1.

The mount plate 2 is formed in a square flat plate shape by a nonmagnetic material made of glass, ceramics or the like and is fixed to a stepped portion of the upper face 1a such that an upper face 21a is arranged on a horizontal plane substantially flush with the upper face 1a of the main body case 1 as shown by FIG. 5. A regulating frame 6 is arranged at the peripheral portion of the upper face 21a of the mount plate 2. The regulating frame 6 is a surrounding in a channel-like shape comprising two walls of a horizontal portion 61 mounted on the mount plate 2 and a vertical portion 62 extending from the end portion on the inner side of the horizontal portion 61 substantially toward the upward direction and is opened at the front face of the main body case 1.

As shown in FIG. 3, the heating plate 3 is a plate-like member formed by cladding stainless steel plates on both surfaces of a copper plate, which is formed in a square flat plate shape slightly larger than the mount plate 2 and where a heating face for generating heat by the electromagnetic induction operation of the induction heating coil 11 is formed. The heat shielding plates 4 comprising vertical walls substantially orthogonal to the heating plate 3 are fixed to side face portions of the heating plate 3. The heat shielding plate 4 comprises an inner wall 41 and an outer wall 42 and is provided with a hung-down portion 41a hung from the heating plate 3, that is formed by the inner wall 41 and a lid receiving portion 42a erected from the heating plate 3, that is formed by the outer wall 42. the heat shielding plate 4 is substantially removed at the front side face portion of the heating plate 3, only the hung-down portion 41a bent downwardly from the heating plate 3 is attached and the edge portion of an upper face 31a of the heating plate 3 is opened and accordingly, cook stuff mounted on the upper face 31a can be taken out easily.

The heat shielding plate 4 attached to the rear end face portion of the heating plate 3 is fixed to an axially supporting base 32 of the heating plate 3. Support shafts 33 and 34 are respectively projected from both end surfaces of the base 32 and the support shafts 33 are supported by a pair of left and right bearings 19 attached to the rear end portion of the upper face 1a of the main body case 1. Each of the bearings 19 is provided with a sliding movement stopping long-hole 35 into which the support shaft 34 is slidingly inserted and which guides pivoting of the heating plate 3 around the support shaft 33.

By such an axially supporting structure, the position of the heating plate 3 is pivotably switched between the facing position (FIG. 1 and FIG. 4) facing the mount plate 2 to form a gap corresponding to the thickness of the cook stuff above the mount plate 2 and the separating position (FIG. 2 and FIG. 3) separating from the facing positions or from the mount plate 2. When the heating plate 3 is at the facing position, if current is made to flow to the induction heating coil 11, eddy current is generated at the inside of the heating plate 3 by the electromagnetic induction operation of the induction heating coil 11 whereby the heating face is formed on the upper and lower two surfaces of the heating plate 3. When the heating plate 3 is pivoted from the facing position toward the direction of the separating position, the electromagnetic induction operation in respect of the heating plate 3 is attenuated, and is extinguished at the separating position.

A handle 43 in a L-like shape projected from the left side of the heat shielding plate 4 is attached to the front portion of the heat shielding plate 4. Further, axially supporting pieces 44 of the lid 4 are respectively arranged to project outwardly at the both end portions of the left outer wall 42 of the heat shielding plate 4. The axially supporting pieces 44 support axially supported pieces 51 of the lid 5 extending toward the left outward direction from the lid 5.

As illustrated by FIG. 5 the position of the lid 5, is pivotably switched between a facing position facing the heating plate 3 to form a gap corresponding to the thickness of the cook stuff above the heating plate 3 and a separating position separating from the facing position or from the heating plate 3. Flange portions 52 are formed at edge portions of the lid 5 except the front end portion for restraining heat generated between the heating plate 3 and the lid 5 from flowing out by covering lid receiving portions 42a. A handle 53 for pivoting the lid 5 is attached to the flange portion 52 at the right side of the lid 5 opposed to the axially supported pieces 51.

The handle 53 is supported by a metal fitting 54 with the upper face of the flange portion 52 as a base thereof, and the lid 5 is attachably and detachably connected to the lid receiving portion 42a by a magnetic holder fixed to the lid receiving portion 42a (not illustrated).

Figure 6:
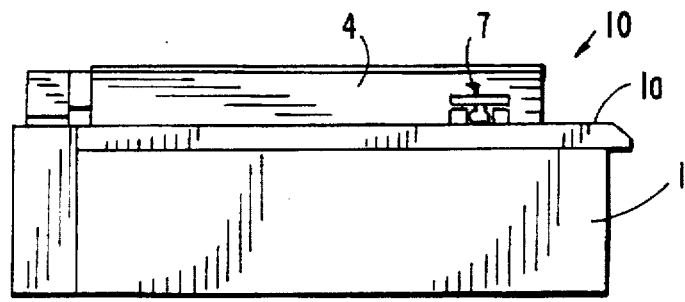
FIG. 6 is a side view of the bake stuff cooker of FIG. 1 showing a position where a lock mechanism is arranged.
Figure 7:
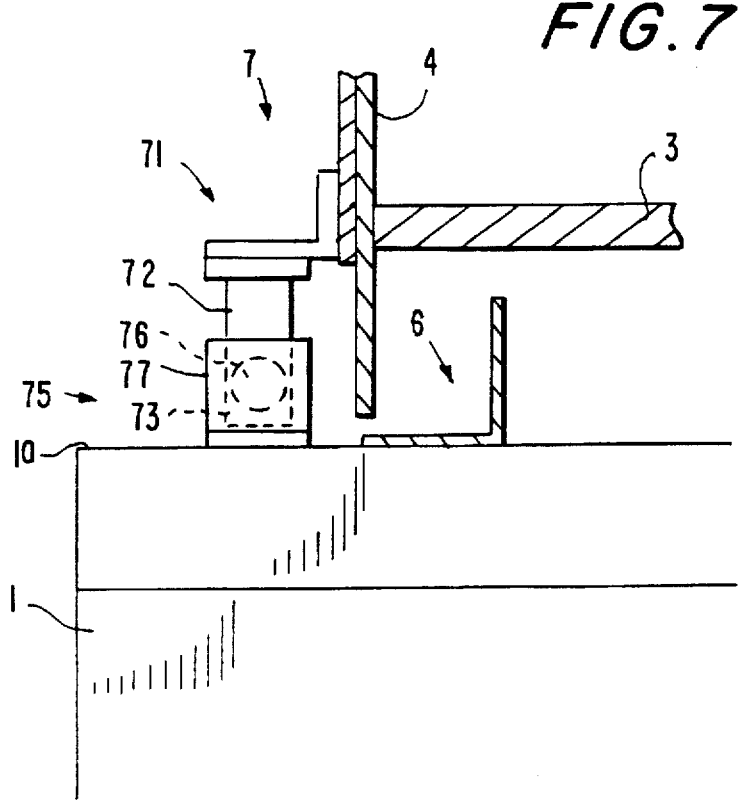
FIG. 7 is a side view of the lock mechanism (lock position)
Figure 8:
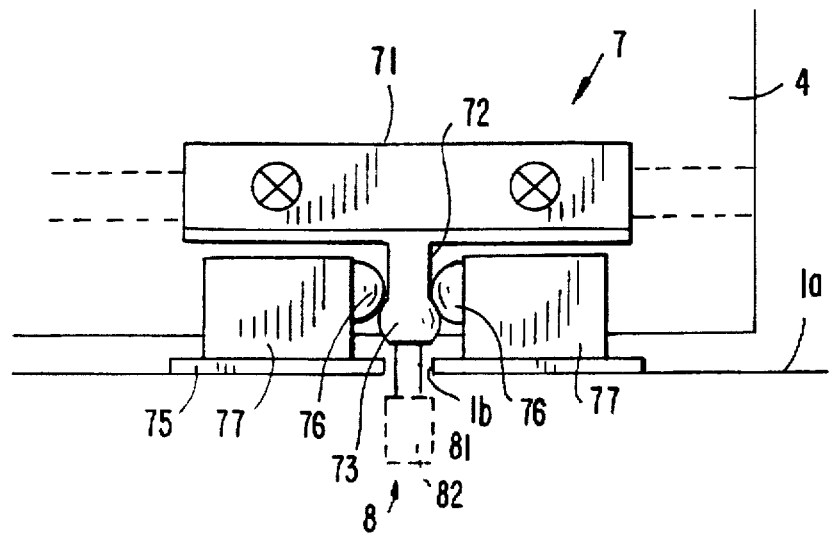
FIG. 8 is a front view of the lock mechanism (lock position)
Figure 9:
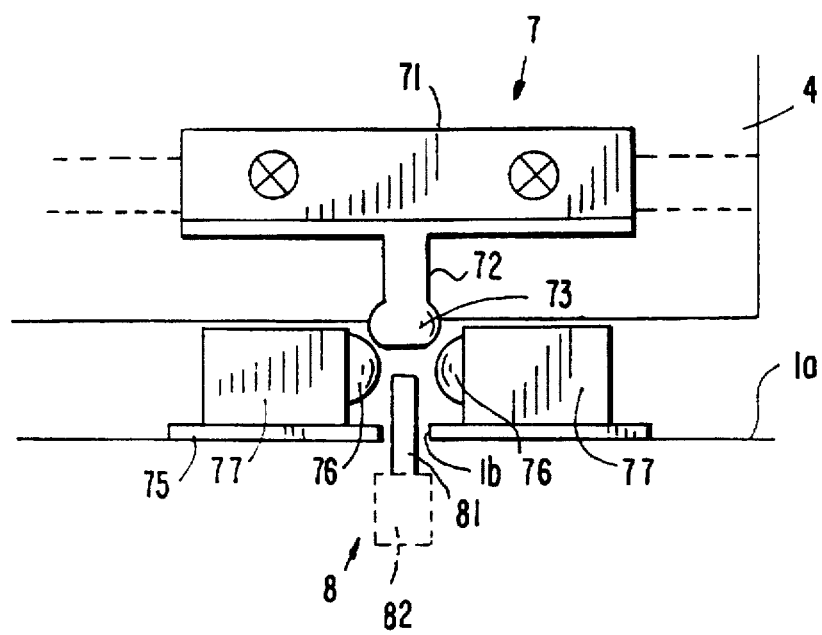
FIG. 9 is a front view of the lock mechanism (lock-release position)

As shown by FIG. 6, the cooker 10 is provided with a lock mechanism 7 spanning the front portion of the left outer side face of the heat shielding plate 4 and the upper face 1a of the main body case 1 in the proximity thereof for locking releasably the heating plate 3 in respect of the main body case 1 when the heating plate 3 is closed. As shown in FIG. 7 through FIG. 9, the lock mechanism 7 comprises a ball body 71 arranged at the outer side face of the heat shielding plate 4 and a ball engaging body 75 arranged on the upper face 1a of the main body case 1. The ball body 71 is a rod-like member hanging down in substantially a vertical direction and is provided with an expanded portion 73 at the lower end of a shaft portion 72.

Meanwhile, the ball engaging body 75 comprises a pair of rods 76 having heads in a spherical shape which are separated in the forward and backward direction of the main body base 1 and substantially in parallel to the upper face 1a of the main body case 1 and a pair of cases 77 arranging the rods 76 such that the both heads are opposed to each other. Urging means, not illustrated, for urging to extract the rods 76 to the side of the heads against a pressing force component in the horizontal direction of the expanded portions 73 when the ball body 71 is lowered and inserted through the ball engaging body 75, are installed inside of the cases 77, the pair of rods 76 are expanded recoverably on the axis by the expanded portion 73 and the ball body 71 is releasably locked by the ball engaging body 75 by pressing the opposed two side surfaces of the shaft portion 72.

A fixing switch 8 as lock detecting means for detecting the lock position and the lock-release position of the heating plate 3, is arranged below the lock mechanism 7. The fixing switch 8 is a microswitch comprising a plunger 81 projected from a hole 1b at the upper face 1a of the main body case 1 which is perforated below the expanded portion 73 of the ball body 71 and a switch 82 for opening and closing terminals in accordance with the movement in the upward and downward direction of the plunger 81, where the terminals are closed at the lock position (FIG. 8) of the heating plate 3 and opened at the lock-release position (FIG. 9).

[Embodiments of the Control Operation]

Embodiment 1

Figure 10:
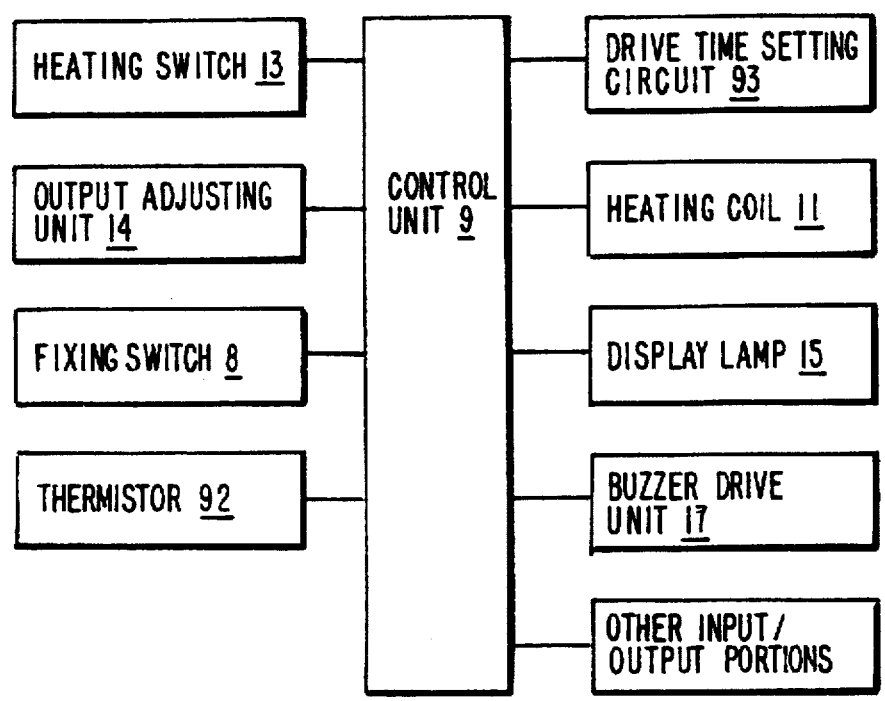
FIG. 10 is a control block diagram of the bake stuff cooker of FIG. 1.
Figure 11:
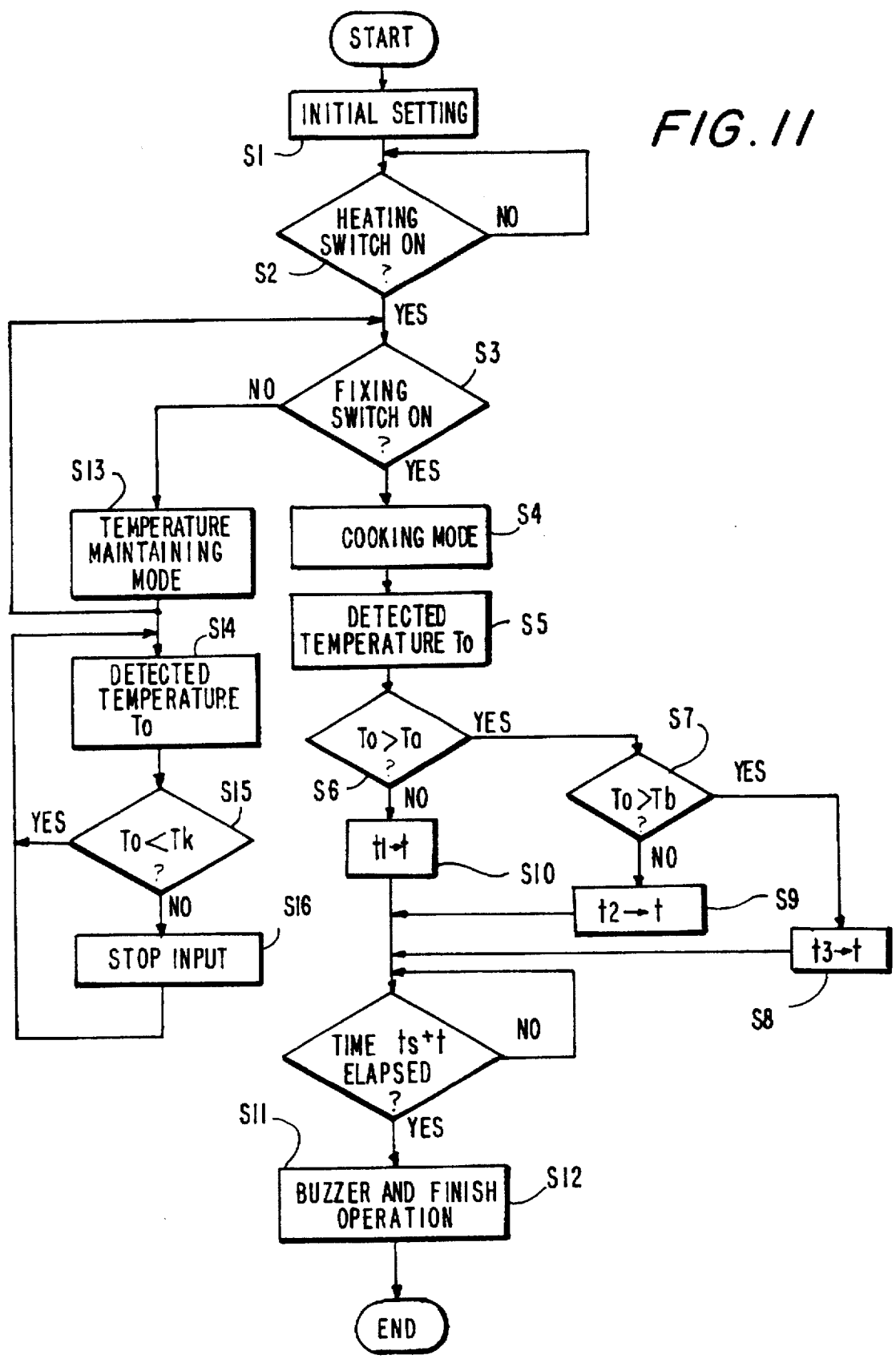
FIG. 11 is a control flowchart of the bake stuff cooker of FIG. 1.
Figure 12:
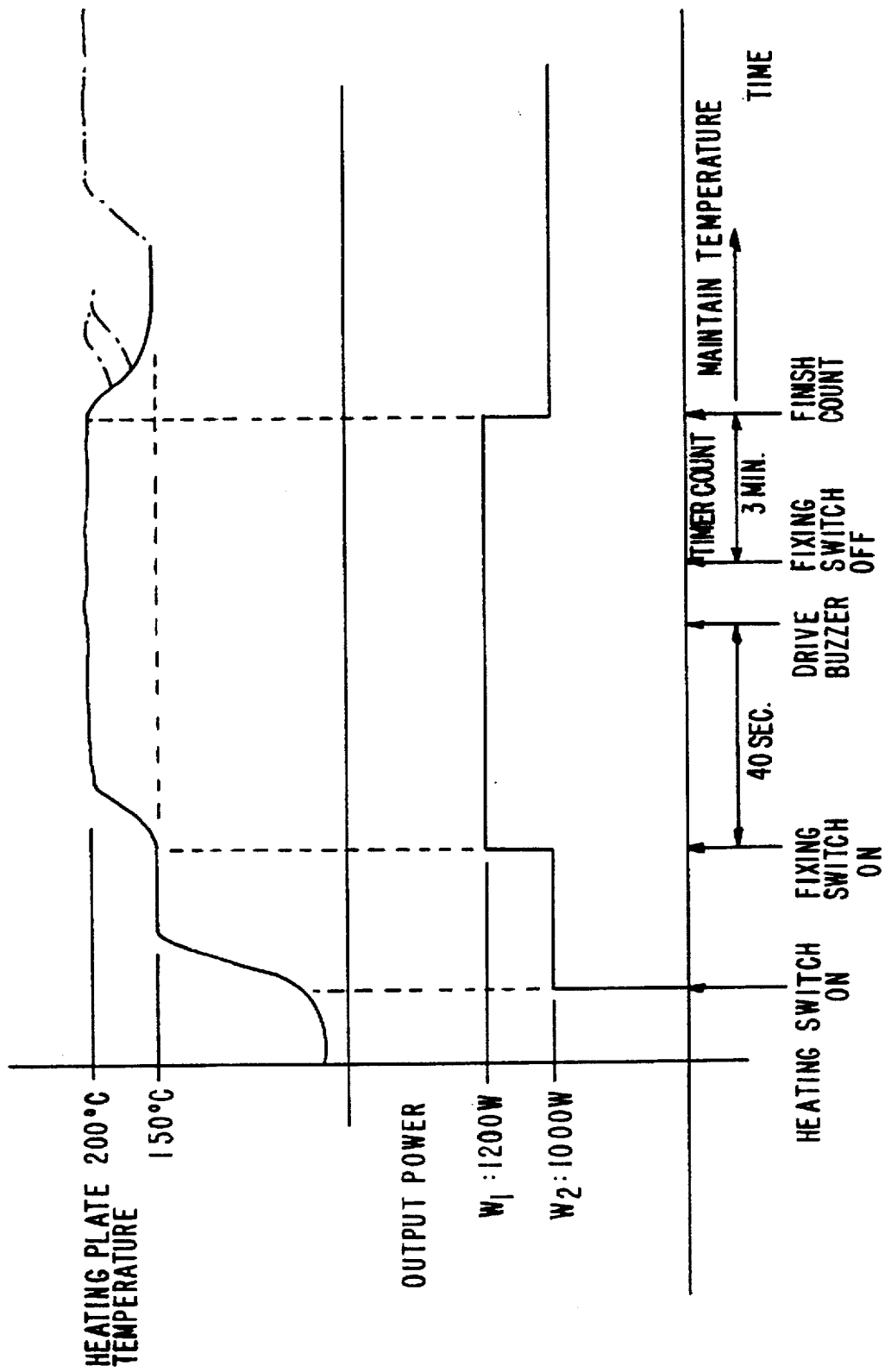
FIG. 12 illustrates time charts showing an input to an induction heating coil 11 and a temperature of the heating plate corresponding to FIG. 11.

FIGS. 10 to 12 show an embodiment of heating control according to the cooker 10 of the present invention.

FIG. 10 is a control block diagram of the cooker 10. The cooker 10 is provided with a control unit 9 including a microcomputer having CPUs, ROMs, RAMs, timers and the like. Respective input and output portions of the heating switch 13, the output adjusting unit 14, the fixing switch 8, the thermistor 92, a drive time setting circuit 93, the induction heating coil 11, the display lamp 15, a buzzer driving unit 17 and the like are connected to the control unit 9. The drive time setting circuit 93 sets an adjusted drive time ta of the induction heating coil 11 by adding or subtracting a drive time t in respect of a predetermined reference drive time ts (in this case 40 seconds) of the induction heating coil 11.

FIG. 11 is a control flowchart showing the operation of the control unit 9 in the cooker 10 and FIG. 12 illustrates time charts showing the input to the induction heating coil 11 and the temperature of the heating plate 3. An explanation will be given of the operation of the control unit 9 as follows.

In FIG. 11, a power source switch, not illustrated, is made ON, an initial setting such as setting the reference drive time ts is conducted in step S1 and when the heating switch 13 is made ON in step S2, cook stuff is mounted. Specifically, firstly, the heating plate 3 is opened up to the separating position above the mount plate 2 by the handle 43 and the regulating frames 6 are arranged at the peripheral portions of the mount plate 2 and thereafter, the cook stuff, for example, bread for hamburger divided in two by being cut in the horizontal direction is mounted on the mount plate 2 inside of the regulating frames 6 with the cut face of the lower portion (heel) of bread facing upwardly. Next, the heating plate 3 is closed up to the position facing the mount plate 2 by the handle 43 and the lid 5 is opened up to the separating position above the heating plate 3 by the handle 53 and the upper portion (crown) of bread for hamburger is mounted on the upper face of the heating plate 3 with the cut face thereof facing downwardly and thereafter, the lid 5 is closed up to the position facing the heating plate 3 by the handle 53.

In step S3, whether the fixing switch 8 is at ON state, that is, the heating plate 3 is at the lock position is determined. Here, when it is determined that the heating plate 3 is locked at the lock position by the lock mechanism 7 and the terminals of the fixing switch 8 are closed as shown by FIG. 8, the operation proceeds to step S4. In step S4, the cooking mode is set and 1200 W is supplied to the induction heating coil 11. In step S5, the temperature of the heating plate 3 is detected by the thermistor 92.

Next, the drive time t is set by driving the drive time setting circuit 93 (Steps S6 through S10). Firstly, the detected temperature To is compared with a predetermined lower temperature Ta/150° C. and a predetermined upper temperature Tb/165° C. When the detected temperature To falls in a range lower than the lower temperature Ta/150° C., the drive time t is set to t1, for example, +20 seconds. When the detected temperature To is between the lower temperature Ta/150° C. and the upper temperature Tb/165° C., the drive time t is set to t2, for example, +10 seconds. When the detected temperature To is higher than the upper temperature Tb/165° C., the drive time t is set to t3, for example, +5 seconds. The drive time setting circuit 93 sets the adjusted drive time ta (ts±t) by adding or subtracting the drive time t in respect of the predetermined reference drive time ts/40 seconds of the induction heating coil 11.

Next, when it is determined that a timer 1 of the buzzer drive unit 17 is driven and the adjusted drive time ta has elapsed in step S11, the buzzer drive unit 17 is driven in step S12. Further, when the heating plate 3 is released from the lock position, the fixing switch 8 is turned into an OFF state.

the timer 2 is driven and, when it is determined that additional three minutes have elapsed, the power supplied to the induction heating coil 11 is switched to 1000 W.

Meanwhile, when it is determined in step S3 that the fixing switch 8 is not at ON state, that is, that the heating plate 3 is at the lock-release position, the operation proceeds to step S13. In step S13, the temperature maintaining mode is set and 1000 W is supplied to the induction heating coil 11. Next, the temperature is detected by the thermistor 92 and a constant temperature control is conducted at a temperature between the detected temperature To and a predetermined maintaining temperature Tk 150° C. (steps S14 through S16).

According to the above-described embodiment, by using the drive time setting circuit 93, the adjusted drive time ta is set comparatively long when the detected temperature To of the heating plate 3 detected by the thermistor 92 is low whereas when the detected temperature To is high, the adjusted drive time ta is set comparatively short. Accordingly, the temperature of the heating plate 3 which has been dropped in a time period from stopping to drive the induction heating coil 11 to starting to drive the induction heating coil 11 again, is adjusted by the drive time t by which the cook stuff can be heated uniformly at every time.

Further, the control unit 9 is provided with the cooking mode for driving the induction heating coil 11 by supplying a high power and the temperature maintaining mode for maintaining the temperature of the heating plate 3 by driving the induction heating coil 1 by supplying a power lower than that in the cooking mode after executing the cooking mode and therefore, the temperature of the heating plate 3 at the onset of cooking can be maintained constant while restraining the temperature drop of the heating plate 3.

Embodiment 2

Figure 13:
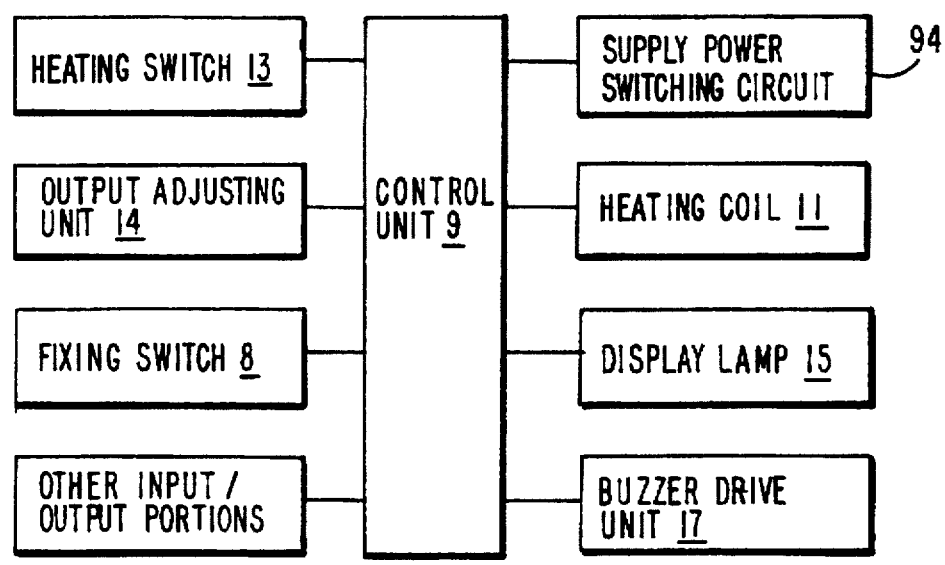
FIG. 13 is a control block diagram showing another embodiment of the bake stuff cooker of FIG. 1.
Figure 14:
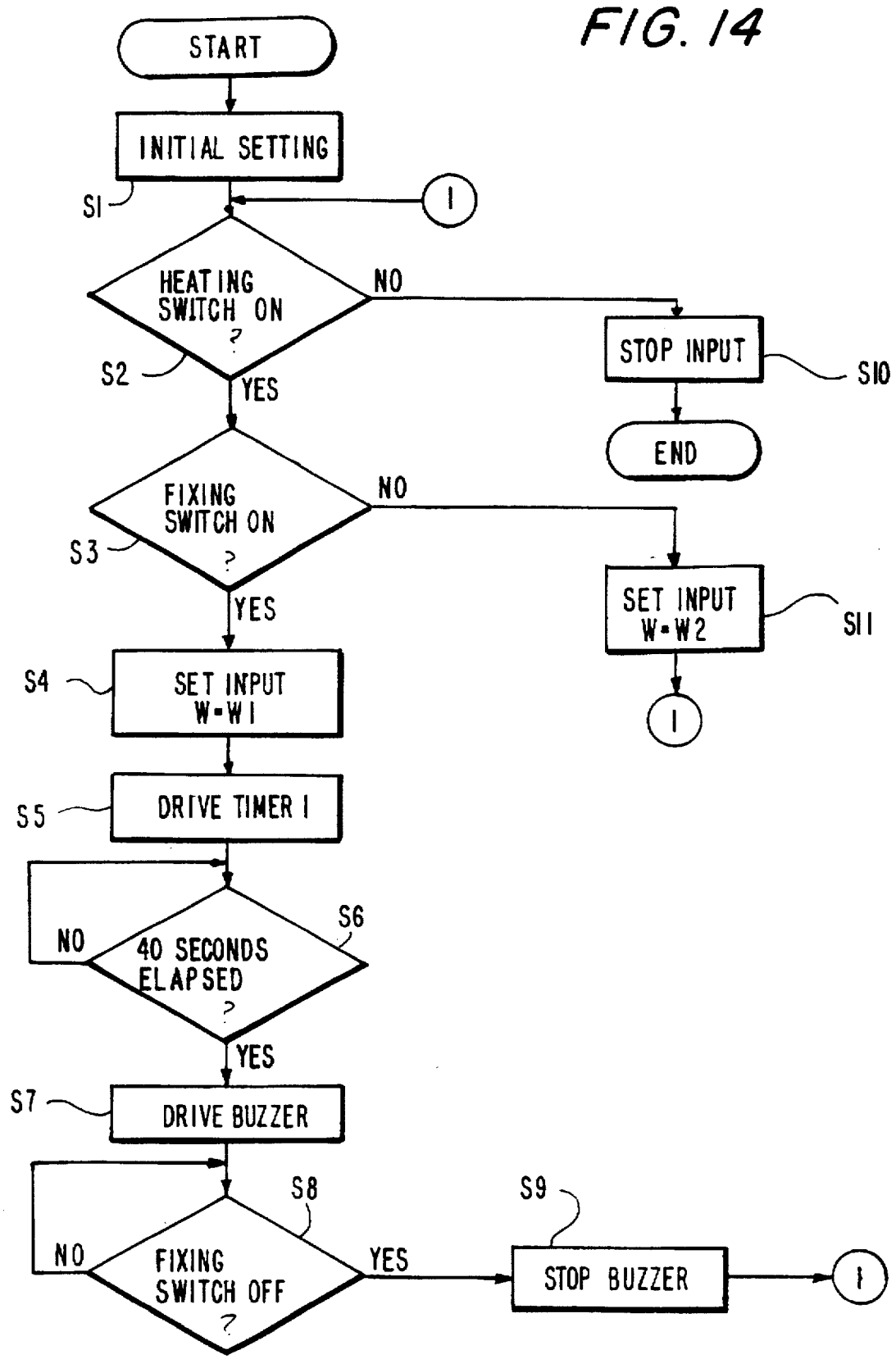
FIG. 14 is a flowchart showing an embodiment of controlling the bake stuff cooker of FIG. 1 corresponding to FIG. 13.

FIGS. 13 and 14 show another embodiment of heating control according to the cooker 10 of the present invention.

FIG. 13 is a control block diagram of the cooker 10. The cooker 10 is provided with a control unit 9 including a microcomputer having CPUs, ROMs, RAMs, timers and the like. Respective input and output portions of the heating switch 13, the output adjusting unit 14, the fixing switch 8, a power supply switching circuit 94, the induction heating coil 11, the display lamp 15, a buzzer driving unit 17 and the like are connected to the control unit 9.

An explanation will be given of the operation of a control unit 9 in respect of embodiments of a cooker 10 in reference to control flowcharts starting from FIG. 14.

In FIG. 14, a power switch, not illustrated, is made ON, an initial setting is carried out in step S1 and a heating switch 13 is made ON in step S2 by which cook stuff is mounted. Specifically, firstly, a heating plate 3 is opened up to a separating position above a mount plate 2 by a handle 43, regulating frames 6 are arranged at the peripheral portion of the mount plate 2 and thereafter, cook stuff, for example, the lower portion (heel) of bread for hamburger that is divided in two by being cut in the horizontal direction, is mounted on the mount plate 2 in the regulating frames 6 with the cut face facing upwardly. Next, the heating plate 3 is closed to dispose at a facing position in respect of the mount plate 2, the lid 5 is opened to dispose at a separating position by a handle 53, the top portion (crown) of bread for hamburger is mounted on the upper face of the heating plate 3 with the cut face facing downwardly and thereafter, the lid 5 is closed to dispose at a facing position in respect of the heating plate 3 by the handle 53.

In closing the heating plate 3 to dispose at the facing position in respect of the mount plate 2, when it is determined that the heating plate 3 is locked at a lock position by a lock mechanism 7 and terminals of the fixing switch 8 are closed in step S3, the operation proceeds to step S4 where supply of power W to the heating plate 3 is set to 1200 W (W1) and a timer 1 of a buzzer drive unit 17 is driven. The two portions of bread in contact with the upper and lower two faces of the heating plate 3 are heated and cooked by the heating plate 3 that is heated by the electromagnetic induction operation. After approximately 40 seconds a buzzer drive unit 17 is driven and "baked up" is informed (steps S5 through S7).

The lid 5 is opened to dispose at the separating position above the heating plate 3, the portion of bread on the upper face of the heating plate 3 is scooped by a spatula, the heating plate 3 is opened to dispose at the separating position above the mount plate 2 by the handle 43 and the portion of bread on the lower face of the heating plate 3 is similarly scooped.

In opening the heating plate 3 as described above, when it is determined that the heating plate 3 is moved from the lock position to the lock-release position in the lock mechanism 7 and the terminals of the fixing switch 8 are opened, the operation proceeds to step S9 where a buzzer drive unit 17 is stopped to drive.

Next, the operation proceeds to step S2 and whether the heating switch 13 is made ON is determined. When the result of determination is NO, the operation proceeds to S10 where power supply to the heating plate 3 is stopped. When the result of determination is YES, whether the terminals of the fixing switch 8 are closed is determined in step S3. When the result of determination is NO, that is, when the heating plate 3 is opened even slightly, the operation proceeds to step S11.

In step S11, a power supply switch circuit 94 is driven and power supply to the heating plate 3 is switched from a first power 1200 W (W1) to a second power 1000 W (W2). Thereby, during a period from when the cook stuff is taken out to when a new one of the cook stuff is mounted, the mount plate 2 and the heating plate 3 are brought into a state of stand-by where the temperature is maintained by a low power.

When a new cook stuff is mounted onto the mount plate 2 and the heating plate 3, and the heating plate 3 is closed, as described above, the operation proceeds from step S2 to step S4 via step S3 and the control unit instructs the power supply switch circuit 94 to switch the power supplied to the heating plate 3 from the second low power to the first high power whereby the cook stuff is heated. In this case, a time period from the above-described stand-by state to a state where the temperature is elevated to the predetermined cooking temperature is short and the power consumption is far smaller than that in the case where the temperature is always maintained by the high power for cooking.

Embodiment 3

Figure 15:
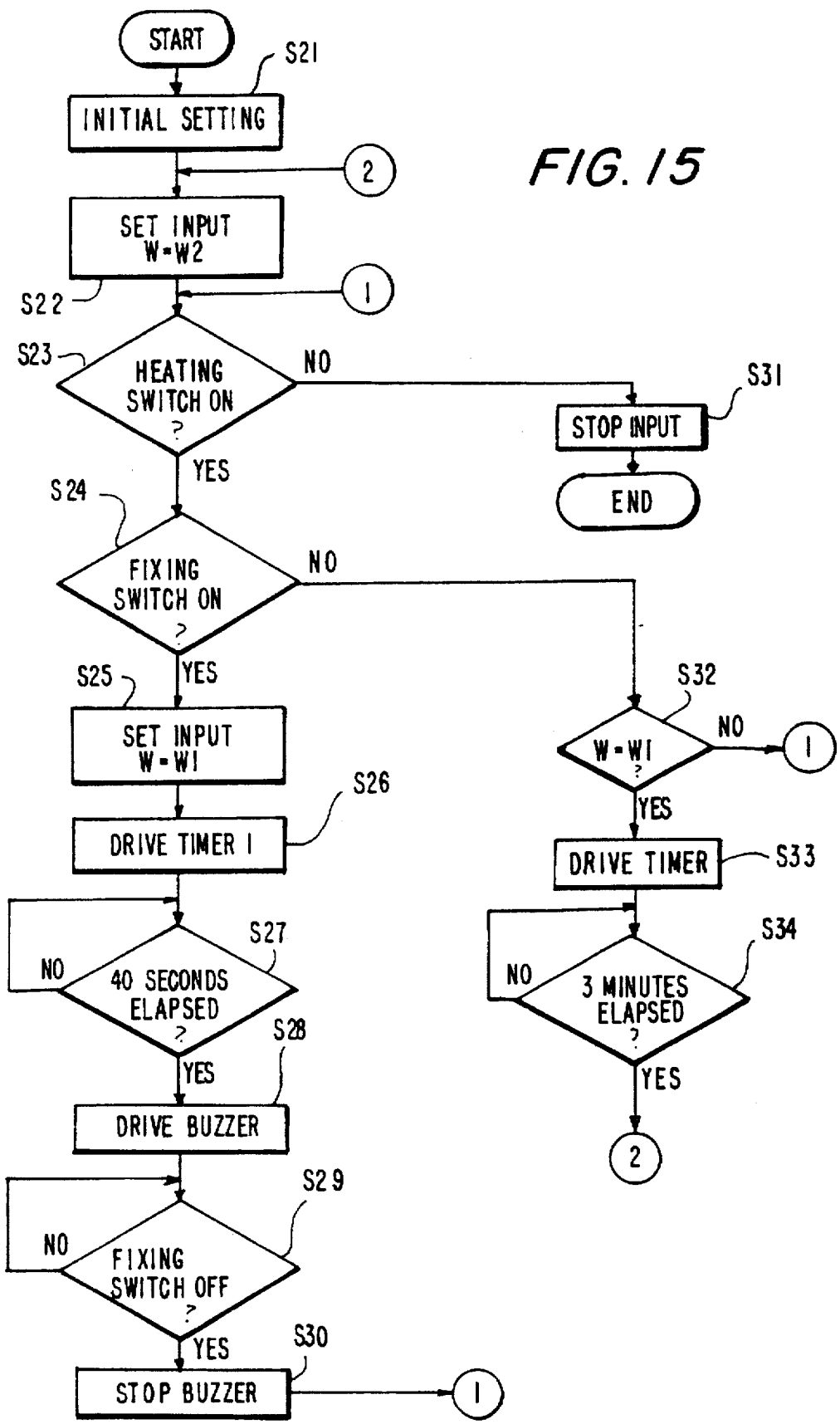
FIG. 15 is a flowchart showing still another embodiment of controlling the bake stuff cooker of FIG. 1.

FIG. 15 shows still another embodiment of heating control according to the cooker 10 of the present invention. The control block diagram of the cooker 10 is the same as that of FIG. 13.

In FIG. 15, a power switch, not illustrated, is made ON, an initial setting is carried out in step S21 and the second power 1000 W (W2) that is a low power is supplied to the heating plate 3 in step S22. Thereby, the heating plate 3 is brought into the stand-by state where the temperature is maintained by using the low power. When the heating switch 13 is made ON in step S23, cook stuff is mounted as in the above Embodiments. In closing the heating plate 3 to dispose at the facing position in respect of the mount plate 2, when it is determined that the heating plate 3 is locked at the lock position by the lock mechanism 7 and the terminals of the fixing switch 8 are closed, the operation proceeds to step S25 where the power W supplied to the heating plate 3 is set to 1200 W (W1) that is a large power and the timer 1 of the buzzer drive unit 17 is driven.

The two portions of bread in contact with the upper and lower two faces of the heating plate 3 are cooked by the heating plate 3 that is heated by the electromagnetic induction operation. After approximately 40 seconds, the buzzer drive unit 17 is driven and "baked up" is informed. When the heating plate 3 is opened from the lock position to the lock-release position, the buzzer drive unit 17 is stopped to drive (step S26 through S30). The heated bread is scooped by the spatula.

Next, the operation proceeds to step S23 and whether the heating switch 13 is made ON is determined. When the result of determination is NO, the operation proceeds to step S31 and the power supplied to the heating plate 3 is stopped. When the result of determination is YES, whether the terminals of the fixing switch 8 are closed is determined in the step S24. When the result of determination is NO, that is, when the heating plate 3 is opened even slightly, the operation proceeds to step S32.

In step S32, whether the power supplied to the heating plate 3 is the first power 1200 W (W1) is determined. When the result of determination is NO, the operation proceeds to S23. When the result of determination is YES, that is, when the first power 1200 W (W1) is supplied to the heating plate 3, the operation proceeds to step S33.

In step S33, a timer 2 for the power supply switch circuit 94 is driven and after a set time period of three minutes has elapsed, the operation proceeds to step S22. In step S22, the power supplied to the heating plate 3 is switched to the second power 1000 W (W2) that is a small power. Thereby, the mount plate 2 and the heating plate 3 are brought into the stand-by state where the temperature is maintained by the small power.

In this way, the control unit 9 switches from the first power to the second power 1000 W (W2) after continuously supplying the first power 1200 W (W1) for the predetermined time period (3 minutes) after the time point when the closed state of the lid 5 has been released and accordingly, a time period required to elevate the temperature to a predetermined cooking temperature is extremely shortened since the temperature of the mount plate 2 and the heating plate 3 is maintained at high temperatures during a time period during which the first power W1 is supplied to the heating plate 3. Further, the temperature of the mount plate 2 and the heating plate 3 is maintained by the low power supplied to the heating plate 3 during a time period until a new one of the cook stuff is mounted and accordingly, the time period required for elevating the temperature to the predetermined cooking temperature is short and the power consumption is far less than that in the case where the temperature is always maintained by the high power for cooking.

Embodiment 4

FIGS. 16 to 21 show still another embodiment of heating control according to the cooker 10 of the present invention.

Figure 18:
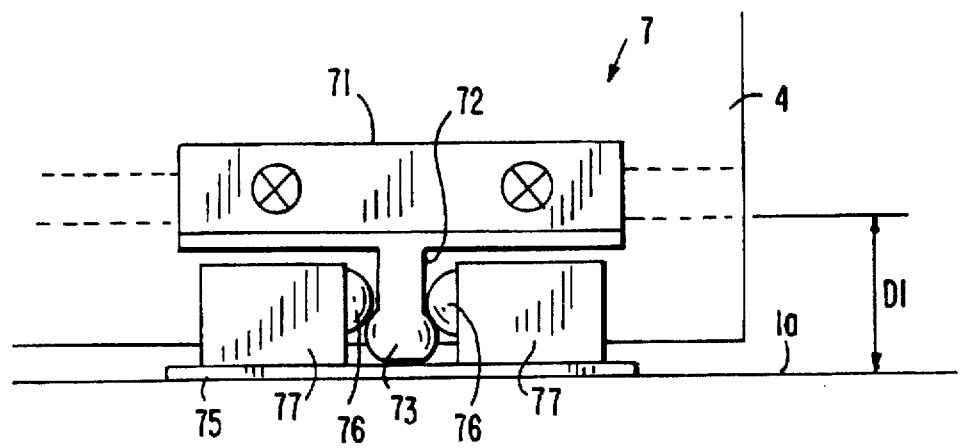
FIG. 18 is a view for explaining a state of a heating plate in controlling the constitution as illustrated by FIG. 17 (lock position)
Figure 19:
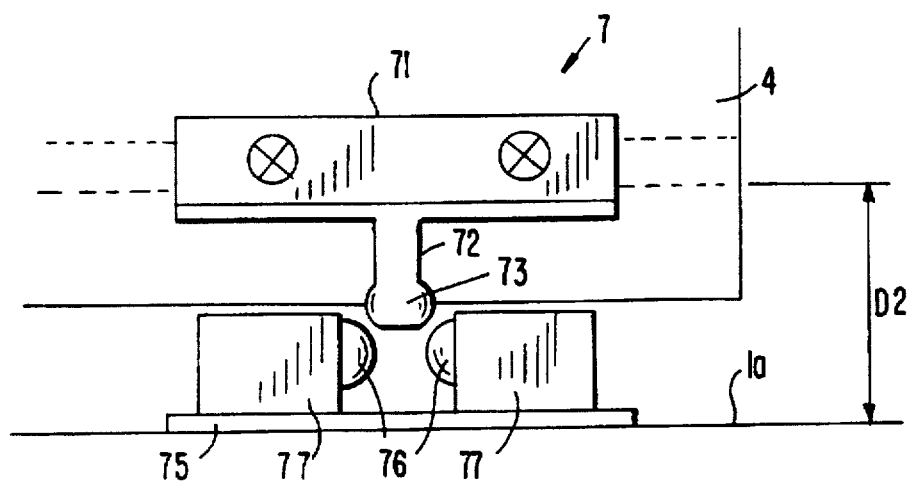
FIG. 19 is a view for explaining a state of the heating plate in controlling the constitution as illustrated by FIG. 17 (lock-release position)

The constitution of this embodiment is different from those in the above-described embodiments in that the lock detecting means is not provided below the lock mechanism 7 as shown by FIGS. 18 and 19. That is, a change in eddy current caused in the induction heating coil 11 by a distance D between a ball body 71 of the lock mechanism 7 and an upper face 1a of the main body case 1, is utilized.

Figure 16:
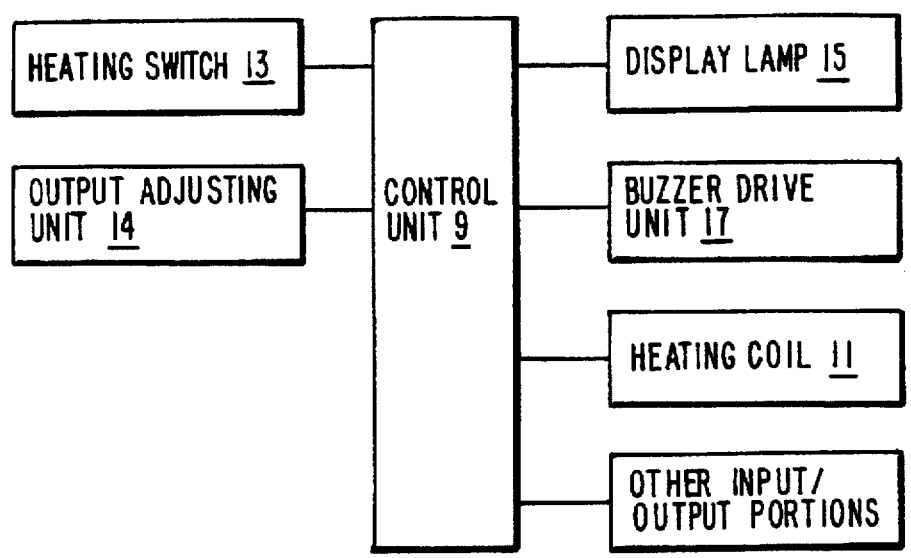
FIG. 16 is a control block diagram showing still another embodiment of the bake stuff cooker of FIG. 1.
Figure 17:
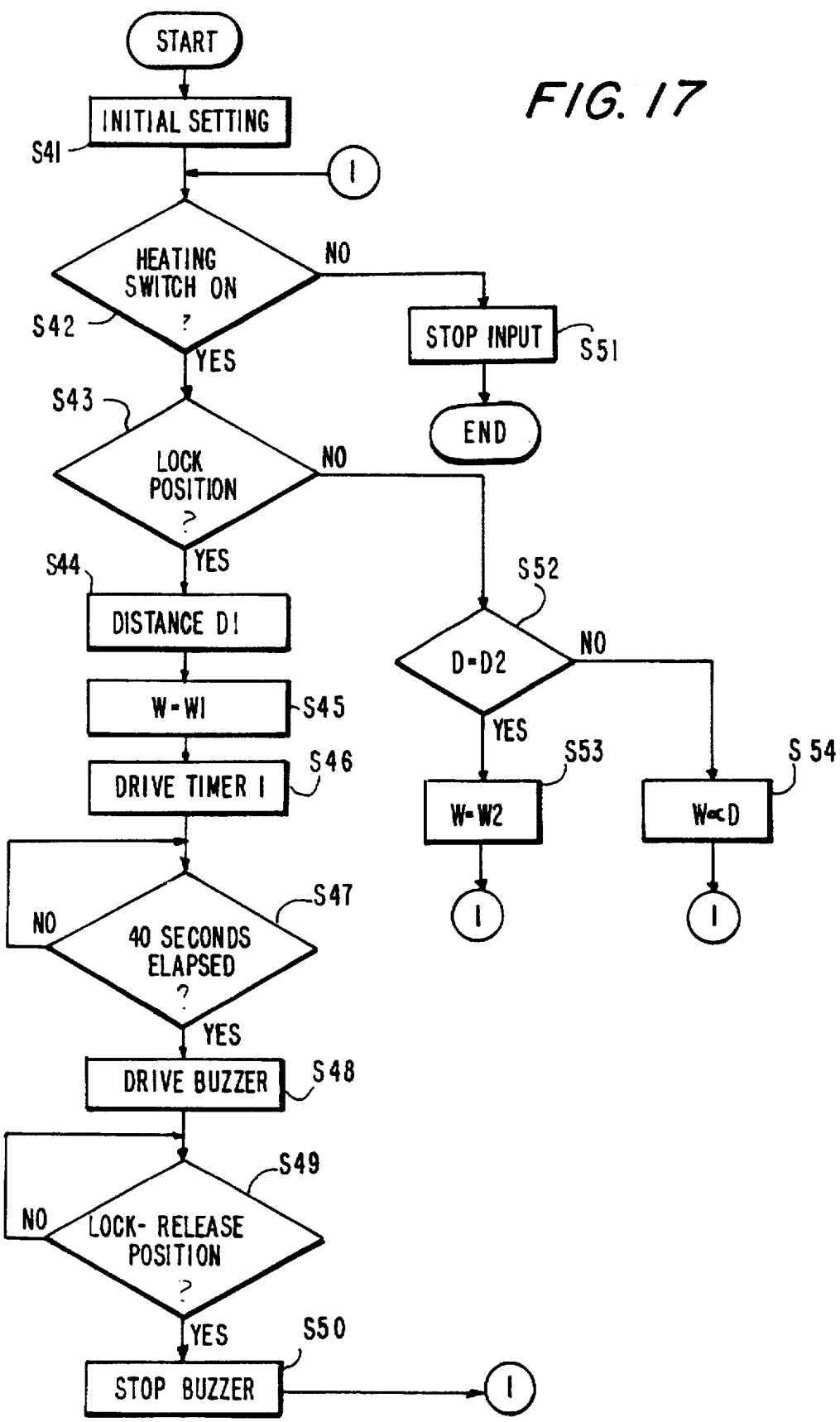
FIG. 17 is a flowchart showing still another embodiment of controlling the bake stuff cooker of FIG. 1 corresponding to FIG. 16.

In FIG. 16, firstly, a power source switch, not illustrated, is made ON, an initial setting is carried out in step S41 and the heating switch 13 is made ON in step S42 by which cook stuff is mounted similar to Embodiment 1. In step 43, whether the heating plate 3 is disposed at the lock position is determined.

Here, when it is determined that the heating plate 3 is locked at the lock position by the lock mechanism 7 as shown by FIG. 18, the operation proceeds to step S44. In step S44, the distance D between the ball body 1 attached to the heat shielding plate 4 and the upper face 1a of the main body case 1 corresponds to a distance D1 by which the power W supplied to the heating plate 3 is set to 1200 W (W1) that is a large power and the large power of 1200 W (W1) is supplied to the heating plate 3 in step S45. In step S46 the timer 1 of the buzzer drive unit 17 is driven.

The two portions of bread in contact with the upper and lower two faces of the heating plate 3 are cooked by the heating plate 3 that is heated by the electromagnetic induction operation. After approximately 40 seconds, the buzzer drive unit 17 drives the buzzer and "baked up" is informed. When the heating plate 3 is opened to dispose from the lock position to the lock-release position, the buzzer drive unit 17 is stopped to drive (steps S47 through S50). The heated bread is scooped by a spatula.

Next, the operation proceeds to step S42 and whether the heating switch 13 is made ON is determined. When the result of determination is NO, the operation proceeds to step S51 and the supply of power to the heating plate 3 is stopped.

Meanwhile, when it is determined that the heating plate 3 is not disposed at the lock position in step S43, the operation proceeds to step S52. When the distance D between the ball body 71 of the lock mechanism 7 and the upper face 1a of the main body case 1 is a distance D2 at the lock-release position of the lock mechanism 7 as shown by FIG. 18 in step 52, the power W supplied to the heating plate 3 is set to 1000 W (W2) that is a small power in step S53. When the determination in step S52 is NO, a power in proportion to the distance D between the ball body 71 and the upper face 1a of the main body case 1 is provided.

In this way, the input to the induction heating coil 11 is attenuated from the first power 1200 W (W1) to the side of the lower second power 1000 W (W2) in accordance with the degree of opening of the heating plate 3 and the power in accordance with the degree of opening of the heating plate 3 becomes the power W supplied to maintain the temperature of the heating plate 3 and therefore, the time period by which the temperature is elevated to the predetermined cooking temperature is extremely shortened and power consumption is far less than that in the case where the temperature is always maintained by the high power for cooking.

Figure 20:
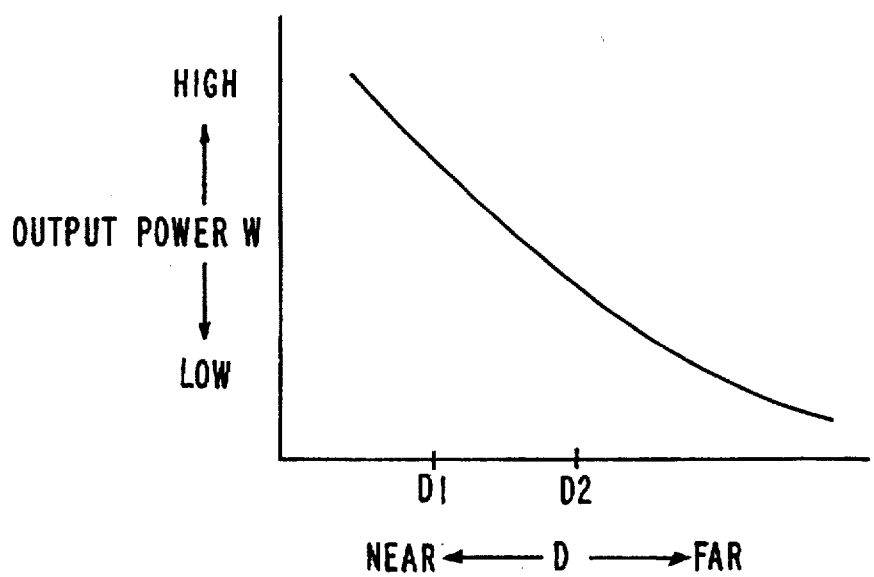
FIG. 20 is a diagram showing a relation between the position of the heating plate and power in controlling the constitution as illustrated by FIG. 17.
Figure 21:
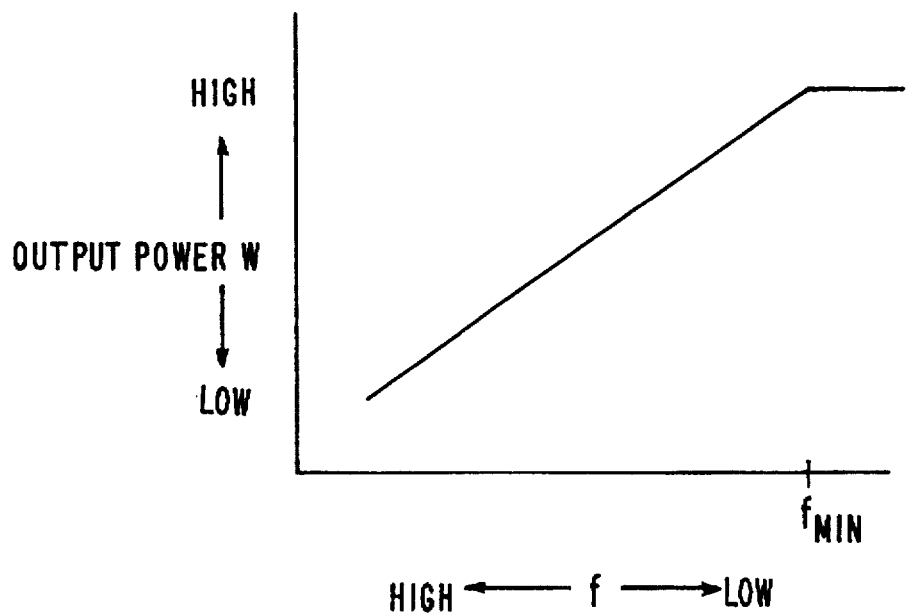
FIG. 21 is a diagram showing a relation between the frequency and power of an induction heating coil in controlling the constitution as illustrated by FIG. 17.

Incidentally, FIG. 20 illustrates a relation between the distance between the ball body 71 of the lock mechanism 7 and the upper face 1a of the main body case 1, that is, the degree of opening of the heating plate 3 and the input W and FIG. 21 illustrates a relation between a minimum control frequency of the induction heating coil 11 that is determined by the degree of opening of the heating plate 3 and the input W.

Embodiment 5

Figure 22:
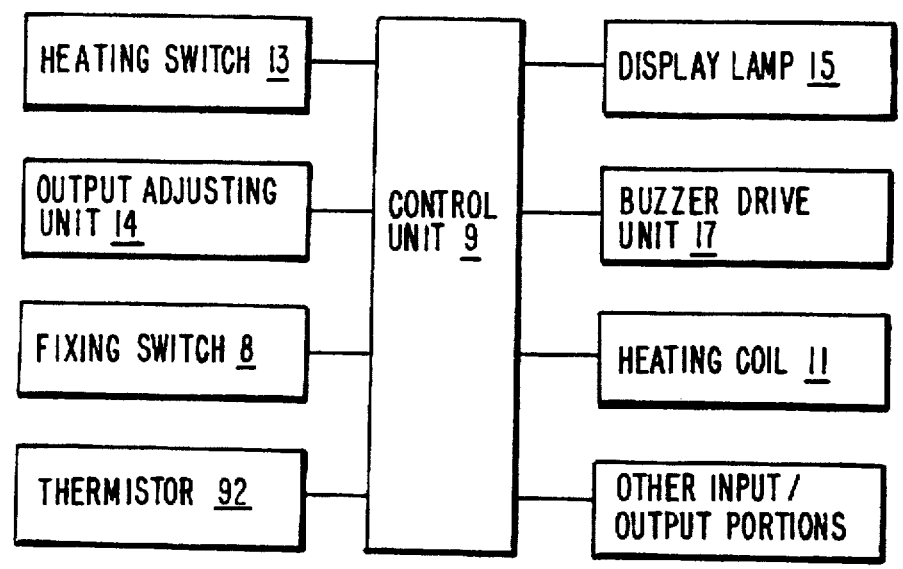
FIG. 22 is a control block diagram showing still another embodiment of the bake stuff cooker of FIG. 1.
Figure 23:
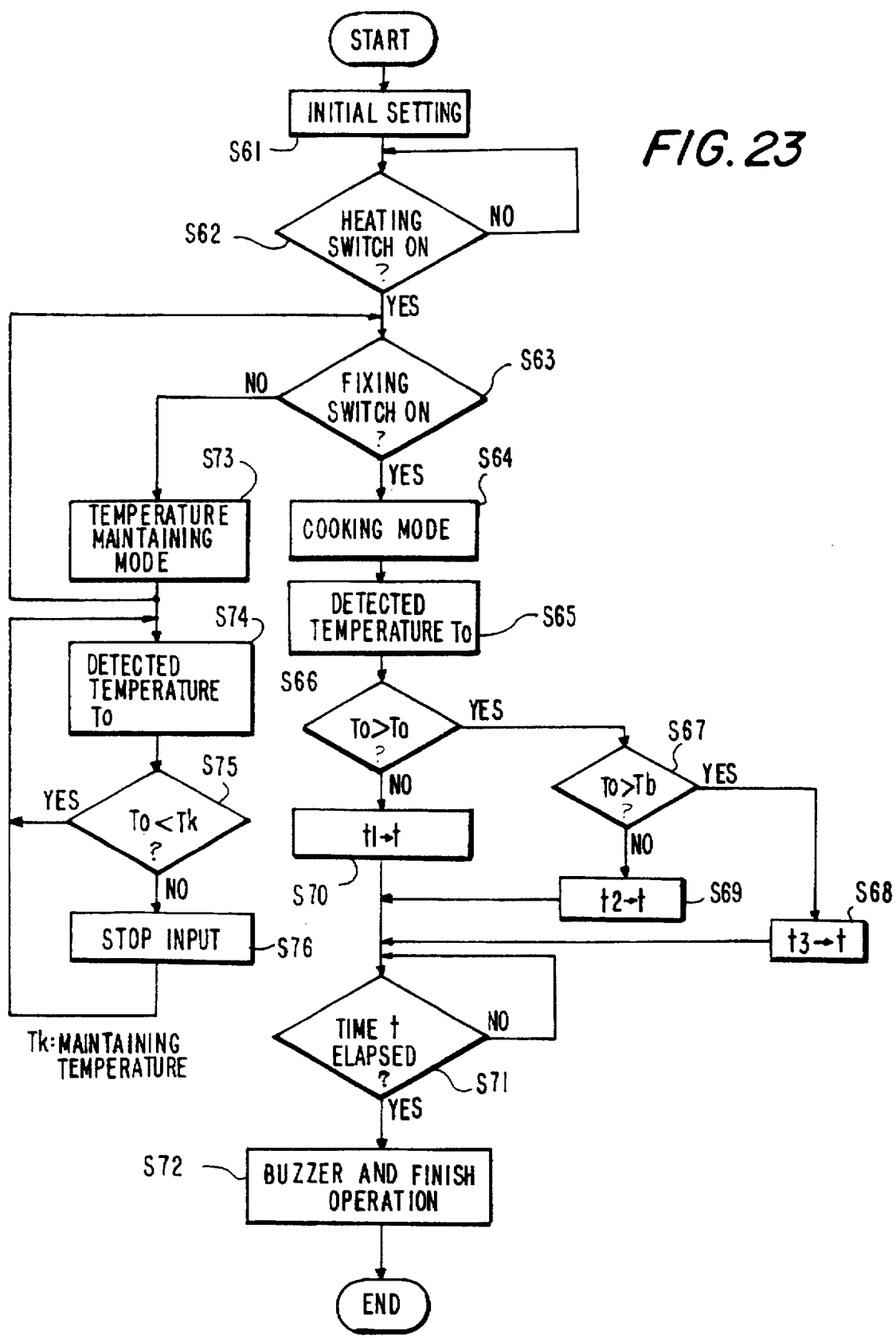
FIG. 23 is a flowchart showing still another embodiment of controlling the bake stuff cooker of FIG. 1 corresponding to FIG. 22.

FIGS. 22 and 23 show still another embodiment of heating control according to the cooker 10 of the present invention. According to Embodiment 5, the cooking mode by using the large power (1200 W) when the heating plate 3 is at the lock position and the temperature maintaining mode by using the small power (1000 W) when it is at the lock-release position, are respectively set and the temperature detecting means for detecting the temperature of the heating plate 3 is provided. Thereby the heating is controlled in accordance with the detected temperature. As illustrated in a block diagram of FIG. 22, a thermistor 92 is provided in the proximity of the heating plate 3 as the temperature detecting means (not illustrated).

In FIG. 23, a power switch (not illustrated) is made ON, an initial setting is carried out in step S61 and the heating switch 13 is made ON in step S62 by which cook stuff is mounted similar to Embodiment 1. Whether the heating plate 3 is at the lock position is determined in step S63.

Here, when it is determined that the heating plate 3 is locked at the lock position by the lock mechanism 7 and the terminals of the fixing switch 8 are closed as shown by FIG. 18, the operation proceeds to step S64. In step S64 the cooking mode is set and the temperature is detected by the thermistor 92 in step S65. The detected temperature To is compared with the predetermined lower limit temperature Ta and the predetermined upper limit temperature Tb. When the detected temperature To is lower than the lower limit temperature Ta, the cooking heating time t is set to t1. When the detected temperature To is in a range between the lower limit temperature Ta and the upper limit temperature Tb, the cooking heating time t is set to t2. When the detected temperature To is higher than the upper limit temperature Tb, the cooking heating time t is set to t3 (steps S66 through S70).

When it is determined that the timer 1 of the buzzer drive unit 17 is driven and the cooking heating time t has elapsed in step S71, the buzzer driving unit 17 drives the buzzer and the supply of power to the induction heating coil 11 is stopped in step S72.

Meanwhile, when it is determined that the heating plate 3 is disposed at the lock-release position in step S63, the operation proceeds to step S73. In step S73, the temperature maintaining mode is set, successively the temperature is detected by the thermistor 92 and a constant temperature control is carried out at a temperature between the detected temperature To and a predetermined maintaining temperature Tk (steps S74 through S76). Incidentally, as set values, the upper limit temperature Tb is 180° C., the lower limit temperature Ta is 150° C., the cooking heating times t1, t2 and t3 are 60 seconds, 50 seconds and 45 seconds, respectively and the maintaining temperature Tk is 150° C.

By such a constitution, the respective heating temperatures in the cooking mode and the temperature maintaining mode are more finely controlled.

As described above, according to the bake stuff cooker in accordance with the present invention, the control unit is provided with the drive time setting circuit for setting the drive time of the heating device in accordance with the temperature of the heating face detected by the temperature detecting means in starting to drive the heating device again after stopping to drive the heating device and therefore, the temperature drop of the heating face caused during the stand-by time after stopping to drive the heating device until starting to drive the heating device again, is compensated by adjusting the heating time, whereby the cook stuff can be heated uniformly at every time.

When the control unit is provided with the power supply switching circuit, the time period required for elevating the temperature to the predetermined cooking temperature in taking out the heated cook stuff and mounting a new cook stuff is extremely shortened. Further, after the predetermined period of time has elapsed, the temperature of the mount plate and the heating face is maintained by the small power supplied to the heating device and therefore, the time period required for elevating the temperature to the predetermined cooking temperature is shortened and the power consumption is far smaller than that in the case where the temperature is always maintained by the large power for cooking.

When the bake stuff cooker is provided with the constitution where the heating device comprises an induction heating coil disposed in the main body case and below the mount plate, the mount plate comprises a nonmagnetic material that is not induced to generate current by an electromagnetic induction operation of the induction heating coil and the heating plate comprises a magnetic material heated by the electromagnetic induction operation of the induction heating coil, the heating face can be easily formed at the upper and lower two surfaces of the heating plate without heating the mount plate, and the cook stuff mounted on the two surfaces can be efficiently heated and cooked.

When the bake stuff cooker is provided with the constitution where the heating plate is provided with a lock mechanism disposed between the heating plate and the main body case for releasably locking the heating plate in a closed state, the control unit comprises a lock detecting means for detecting a lock position and a lock-release position of the heating plate and the control unit switches the power supplied to the heating device with the power supply switching circuit in accordance with a detection result of the lock detecting means, the heating plate can be restrained from being easily opened and the detection of the lock-release position of the heating plate can be assured.

Accordingly, irrespective of the amount of the standby time after stopping to cook until starting to cook, the cook stuff can be heated uniformly at every time. Also, a bake stuff cooker by which the cooking time is shortened and the conservation of power is achieved can be supplied.

What is claimed is:

1. A bake stuff cooker comprising:

a main body case;

a mount plate attached on an upper surface of the main body case for mounting a cook stuff;

a heating plate pivotally switchable between a facing position facing the mount plate to form a gap corresponding to the thickness of the cook stuff above the mount plate and a separating position separating from the facing position;

the heating plate forming a heating face on an upper surface and/or a lower surface thereof;

a lid for forming another gap corresponding to the thickness of another cook stuff above the heating plate and for covering the heating face on the upper surface of the heating plate;

a heating device for heating the heating face;

a control unit for controlling to drive and stop the heating device; and a temperature detecting means for detecting a temperature of the heating face, wherein the control unit is provided with a drive time setting circuit for setting a drive time of the heating device in accordance with the temperature of the heating face detected by the temperature detecting means in starting to drive the heating device.

2. The bake stuff cooker according to claim 1, wherein the drive time setting circuit sets an adjusted drive time of the heating device by adding or subtracting a drive time in respect of a predetermined reference drive time of the heating device.

3. The bake stuff cooker according to claim 1, wherein the control unit has a cooking mode for heating and cooking the cook stuff by driving the heating device by supplying a first power and a temperature maintaining mode for maintaining the temperature of the heating face by driving the heating device by supplying a second power smaller than the first power after executing the cooking mode, and the control unit is provided with a supply power switching circuit for switching the power supplied to the heating device from the first power to the second power when the first power is supplied to drive the heating device and the closed state of the heating plate is released.

4. The bake stuff cooker according to claim 1, wherein the control unit has a cooking mode for heating and cooking the cook stuff by driving the heating device by supplying a first power and a temperature maintaining mode for maintaining the temperature of the heating face by driving the heating device by supplying a second power smaller than the first power after executing the cooking mode, and the control unit is provided with a power supply switching circuit for switching the power supplied to the heating device from the first power to the second power after the first power is supplied for a predetermined period of time when the first power is supplied to drive the heating device and the closed state of the heating plate is released.

5. The bake stuff cooker according to claim 1, wherein the control unit has a cooking mode for heating and cooking the cook stuff by driving the heating device by supplying a first power and a temperature maintaining mode for maintaining the temperature of the heating face by driving the heating device by supplying a second power smaller than the first power after executing the cooking mode, and the control unit is provided with a power supply switching circuit for switching the power supplied to the heating device from the first power to the second power in accordance with the degree of opening of the lid when the first power is supplied to drive the heating device and the closed state of the heating plate is released.

6. The bake stuff cooker according to claim 5, wherein the heating device comprises an induction heating coil disposed in the main body case and below the mount plate, the mount plate comprises a nonmagnetic material that is not induced to generate current by an electromagnetic induction operation of the induction heating coil, and the heating plate comprises a magnetic material heated by the electromagnetic induction operation of the induction heating coil.

7. The bake stuff cooker according to claim 3, wherein the heating plate is provided with a lock mechanism disposed between the heating plate and the main body case for releasably locking the heating plate in the closed state, the control unit comprises a lock detecting means for detecting a lock position and a lock-release position of the heating plate, and the control unit switches the power supplied to the heating device with the power supply switching circuit in accordance with a detection result of the lock detecting means.

8. The bake stuff cooker according to claim 4, wherein the heating plate is provided with a lock mechanism disposed between the heating plate and the main body case for releasably locking the heating plate in the closed state, the control unit comprises a lock detecting means for detecting a lock position and a lock-release position of the heating plate, and the control unit switches the power supplied to the heating device with the power supply switching circuit in accordance with a detection result of the lock detecting means.

9. The bake stuff cooker according to claim 7, wherein the heating device comprises an induction heating coil disposed in the main body case and below the mount plate, the mount plate comprises a nonmagnetic material that is not induced to generate current by an electromagnetic induction operation of the induction heating coil, and the heating plate comprises a magnetic material heated by the electromagnetic induction operation of the induction heating coil.

10. The bake stuff cooker according to claim 8, wherein the heating device comprises an induction heating coil disposed in the main body case and below the mount plate, the mount plate comprises a nonmagnetic material that is not induced to generate current by an electromagnetic induction operation of the induction heating coil, and the heating plate comprises a magnetic material heated by the electromagnetic induction operation of the induction heating coil.

11. The bake stuff cooker according to claim 1, wherein the control unit is provided with informing means for informing that the temperature of the heating faces is detected to reach a predetermined temperature by the temperature detecting means.

12. The bake stuff cooker according to claim 1, wherein the drive time setting circuit operates when the heating device is restarted after a pause.

* * * * *